April 7, 1970 C. D. McDOWELL 3,505,636
CLAMPING BOLT ASSEMBLY FOR AN EASILY LOOSENED CLAMP
Filed May 8, 1967
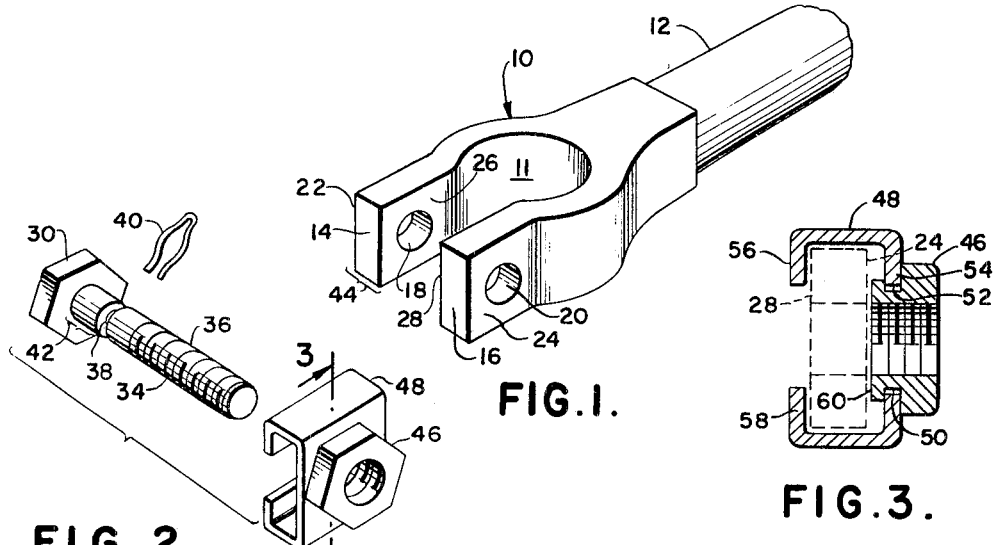
FIG.1.
FIG.2.
FIG.3.
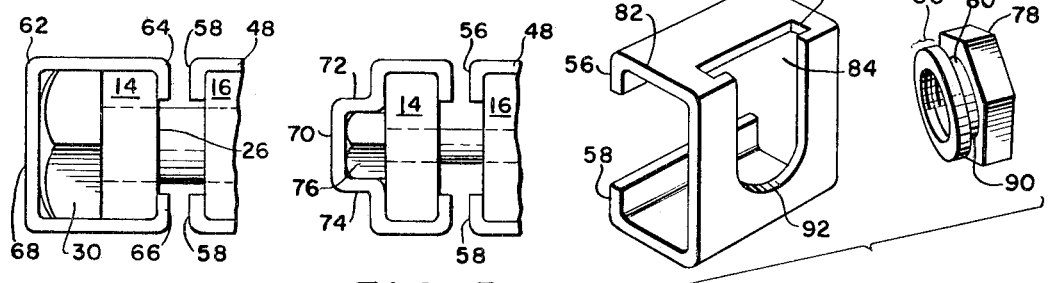
FIG.4.
FIG.5.
FIG.6.
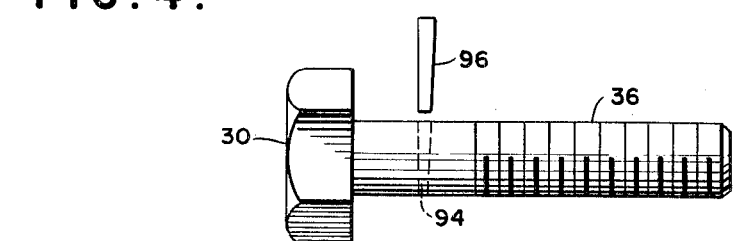
FIG.7.
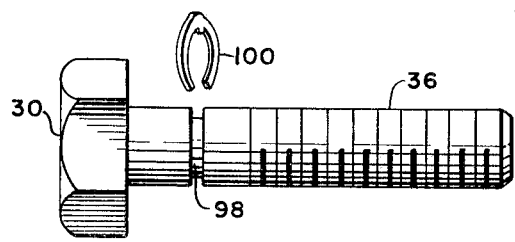
FIG.8.
INVENTOR
Clell D. McDowell
BY Griffin and Branigan
ATTORNEYS

United States Patent Office 3,505,636
Patented Apr. 7, 1970

3,505,636
CLAMPING BOLT ASSEMBLY FOR AN EASILY
LOOSENED CLAMP
Clell D. McDowell, Newport, N.C., assignor of one-half
to Edward F. Bagrowski, Morehead City, N.C.
Filed May 8, 1967, Ser. No. 636,730
Int. Cl. H01r 11/26
U.S. Cl. 339—226                 6 Claims

ABSTRACT OF THE DISCLOSURE

There is herein disclosed a cable clamping bolt assembly which is operative to easily separate the clamping ears of a split-ring device for clamping a cable to a terminal post of a storage battery. A retaining clip prevents the clamping bolt's head from undergoing axial motion with respect to one of the clamp's ears; and a flanged U shaped element prevents the bolt's associated nut from undergoing axial motion with respect to the clamp's other ear. Hence, as the clamping bolt is suitably rotated the nut moves away from the bolt head and the clamp's ears are separated.

---

This invention relates to a clamping bolt assembly and more particularly to a clamping bolt assembly that is adapted to easily loosen clamps of the type which connect battery cables to the posts of automotive storage batteries or the like.

Usually, it is relatively difficult to remove a cable clamp from an associated storage battery's terminal post after the clamp has been affixed thereto for any appreciable period of time. Frequently, in attempting to loosen such a cable clamp either the battery's casing is broken or the terminal post itself is damaged. Also, attempts to loosen stubborn cable clamps commonly result in skinned knuckles for the person attempting to remove the clamp. Hence, it is a prime object of this invention to provide a device which permits a cable clamp to be easily loosened from the battery's terminal post without damaging either the post or the battery casing and at the same time preventing skinned knuckles.

Prior art attempts to solve the above problem have fallen into two broad categories. The first includes relatively expensive and often cumbersome devices which are applied to the conventional cable clamp at the time that it is desired to remove the stubborn clamp from its connection. The second category of cable clamp loosener requires either a special type of cable clamp or a special type of battery post or both. These structures have the obvious disadvantage of inflexibility in that they are not capable of being used with conventional batteries or cables. Further objects of this invention, therefore, are to provide a battery cable clamp which is both inexpensive and simple to manufacture; and which does not require either a special type of battery terminal or a special type of battery cable clamp.

It is a more specific object of the invention to provide a simple battery cable clamp loosener that can be separately distributed and universally applied to substantially any standard battery cable clamp. Moreover, it is intended that the cable clamp loosener of the invention be sufficiently inexpensive that it is suitable for being applied to any given battery clamp and suitably retained as a part of the clamp's structure so that it can be used to loosen the clamp when it is desired to do so. In other words, it is not intended that the cable clamp loosener of the invention be used as a separate tool to be applied to a given clamp only when it is necessary to remove the clamp, but that a separate cable clamp loosener actually be stored with each cable clamp as an element thereof.

It is contemplated that the cable clamp loosener which is about to be described be used in connection with the substantially standard type of split-ring cable clamp. That is, a cable clamp having a cable end suitably fastened to a battery cable per se; and a bifurcated end which is adapted to fit over the conventionally cylindrical battery post. It should be understood, however, that the invention is also applicable to other types of battery posts such as the hexagonal type sometimes found on batteries made in Europe. Normally, the thusly structured battery post clamp has holes in the ends of its bifurcated or clamping ear portions for accommodating a suitable fastener such as a sturdy nut and bolt. In accordance with the principles of the instant invention a relatively conventional bolt has an element on its shank near the bolt's head for preventing the bolt from moving axially within the aperture one of the clamp's ears. At the same time, the nut which is theadibly engaged with the bolt has an element affixed thereto for preventing the nut from undergoing relative axial motion with respect to the clamp's other ear. In this manner, as the bolt is rotated in one direction the nut draws the clamp's ears together; and when the bolt is rotated in the other direction the nut pulls the clamp's ears apart.

A major advantage of the invention is that the above-described bolt and nut assembly can be easily affixed to any conventional split-ring type of clamp. Consequently, although the device is very simple and inexpensive; neither a special battery clamp is required nor is a special terminal post required. Moreover, the invention's clamping bolt may be permanently installed and stored as a member of the clamp itself so that it can be operated to easily loosen the clamp without requiring any special tools or attachments of any kind.

The foregoing and other objects, features and advantages of this invention will be apparent from the following more particular description of preferred embodiments thereof as illustrated the accompanying drawings wherein the same reference numerals refer to the same parts throughout the various views. The drawings are not necessarily intended to be to scale, but rather are presented so as to illustrate the principles of the invention in clear form.

In the drawings:

FIG. 1 is a perspective view of a conventional split-ring clamp for fastening a cable to a storage battery's terminal post;

FIG. 2 is an exploded perspective view of one embodiment of a clamping bolt assembly of the invention;

FIG. 3 is a sectional view through the nut element of the invention's clamping bolt assembly taken along the lines 3—3 of FIG. 2;

FIG. 4 is a fragmentary view of an alternative device for preventing relative axial motion of the bolt head with respect to the clamp's associated clamping ear;

FIG. 5 is a fragmentary view of an alternative embodiment of the FIG. 4 structure;

FIG. 6 is an exploded perspective view of an alternative embodiment of the nut structure illustrated in FIG. 3;

FIGS. 7 and 8 illustrate simple alternative structures for preventing relative axial motion of the clamping bolt's head with respect to the clamp's associated clamping ear.

With reference to FIG. 1 a conventional split-ring clamp 10 is fastened to a cable 12 by any suitable means, not shown. The illustrated clamp is adapted to fit over a conventional terminal post of storage battery, similarly not shown. The clamp has clamping ears 14 and 16 which has apertures 18 and 20 extending from outer faces 22 and 24 through to inner faces 26 anad 28, respectively, of the clamping ears 14 and 16, also respectively.

A preferred embodiment of a bolt assembly by means of which the above-described clamp may be easily loosened is illustrated in FIG. 2. The bolt itself is comprised of a conventional head 30 and shank 34 having the normal threaded end 36. The head-end of the bolt's shank is grooved at 38 to accommodate a suitable spring-clip element such as 40. The space 42 between the bolt head 30 and the groove 38 is at least as wide as the corresponding width 44 on the clamp 10's corresponding ear 14.

The nut portion of the clamping bolt assembly in FIG. 2 is comprised of a nut element 46 and a cable loosening element 48. The relationships between these two elements are better illustrated in FIG. 3. Therein, the nut 46 is illustrated as having a neck or protrusion 50 extending into and through a hole 52 which is drilled or otherwise provided in the vertical face 54 of the cable loosener 48 which also has inwardly directed flanges 56 and 28.

In operation, a centrally apertured portion 11 of the clamp 10 is placed over the storage battery's terminal post in a conventional manner. The cable loosener 48 is then placed over the clamp's ear 16 as is illustrated by dotted lines in FIG. 3. The shank portion 34 of the clamping bolt is then passed through the apertures 18 and 20 of the clamp's ears 14 and 16, respectively, and threadably inserted into the nut 46 which is affixed to the cable loosener by means of a flanged portion 60. In this respect, the nut 46 may be fixed relative to the cable loosener element 48 so long as the head end 30 of the clamping bolt is free to rotate. If, on the other hand, the bolt head 30 is for some reason not able to be rotated, the nut 46 should be suitably rotatably mounted within the cable loosener's vertical face portion 54.

Once the bolt's shank 34 is sufficiently inserted through the clamp's apertures 18 and 20, that the groove 38 passes the inner face 26 of the clamp's ear 14, the spring clip 40 or the like, is inserted into the groove 38 to prevent relative axial motion of the clamping bolt with respect to the ear 14. Hence, the cable loosener 48 retains the nut 46 axially stationary with respect to the clamp's ear 16; and the spring clip 40 retains the bolt head 30 from undergoing axial motion with respect to the clamp's ear 14.

As the bolt head 30 is rotated, the nut 46 is drawn thereon so that the clamping ear 16 is drawn to the left in FIG. 1 and the inner surfaces 26 and 28 of the clamping ears 14 and 16, respectively, are drawn together whereby the clamp is tightened about the terminal post (not shown) in a relatively conventional manner. When it is desired to loosen the clamp 10, however, the bolt head 30 is merely rotated in the opposite direction (counter-clockwise when viewed from the left in FIG. 2 for a right hand threaded bolt). As the clamping bolt is thusly rotated relative to the nut 46, the bolt head 30 and the nut 46 move away from each other. As this occurs, the inwardly directed flanges 56 and 58 of the cable loosening element 48; and the spring clip 40 force their respective clamping ears 16 and 14 to also move away from each other. Consequently, merely by rotating the bolt head 30 in the proper direction, the clamp 10 is easily loosened without the need of special tools or adapters; and moreover, the device is quite suitable for use with substantially any conventional type of split-ring cable clamp.

In this latter respect, it is merely necessary that the bolt's dimension 42 be at least slightly larger than the ear 14's dimension 44; and that the distance between the inwardly directed flanges 56 and 58 and the vertical face 54 of the cable loosener 48 be at least slightly larger than the thickness of the clamp's ear 16. In one actual embodiment of the invention, I found that a suitable dimension for distance 42 was 3/8 of an inch for use in connection with a 1–1½ x 5/16 inch bolt. In that same embodiment the flanges 56 and 58 were 1/8 inch long and were separated from the loosener's vertical face 54 by 3/8 inch.

Although the above embodiment of the invention has been described in connection with a spring clip 40 for preventing axial motion of the bolt head 30 with respect to the clamp's ear 14, this is not necessarily the case. For example, FIGS. 4 and 5 illustrate alternative embodiments of suitable structures. In FIG. 4 a flanged substantially U-shaped member 62 performs a similar function. That is, inwardly directed flanges 64 and 66 engage the inner face 26 of the ear 14 and a vertical face portion 68 on the U-shaped member prevents the bolt head 30 from undergoing relative axial motion with respect to the ear 14. The flanged U-shaped member 62 is substantially identical with the cable loosening element 48 except that it does not require the cable loosener 48's apertured portion 52.

The structure illustrated in FIG. 5 is functionally identical with that of FIG. 4 except that its vertically faced portion 70 which corresponds to the FIG. 4 embodiment's portion 68, is recessed at 72 and 74 so as to accommodate a smaller bolt head 76. In both the FIG. 4 and FIG. 5 embodiments, however, it should be noted that because it might be difficult to rotate the bolt heads, the bolt assembly's nut element 46 should be rotatably mounted with respect to the cable loosening element 48. In fact, in one actual embodiment it has been found desirable to dimension the bolt head's U-shaped member 62 so as to correspond to the dimension across the bolt head's flats and thereby act as a locking element in that it prevents rotation of the bolt head.

FIG. 6 illustrates an alternative embodiment of the clamping bolt assembly's nut element. Therein, a conventional hex nut 78 has a groove 80 cut therein. Rather than having a substantially circular aperture cut in its vertical face as was the case with aperture 52 being cut in the vertical face 54 of FIG. 3 cable loosener, a cable loosener 82 in FIG. 6 has a slot 84 cut therein as shown. The slot 84 is slightly larger than the diameter of the nut's groove 80; and the slot's upper portion 86 is slightly larger than the distance across the nut 78's flats while at the same time being sufficiently wide to accommodate the width 88 of the left hand portion of the nut in FIG. 6.

In operation, portion 88 of the nut 78 is slid downwardly through the portion 86 of the cable loosener 82's slot 84 until the lower portion 90 of the nut's groove 80 rests upon the lower portion 92 of the cable loosener's slot 84. In this manner, the nut 78 is free to rotate within the slot 84 and about the threaded portion 36 of the clamping bolt without requiring a flanging operation which is required to fabricate the flange 60 in the FIG. 3 embodiment. In all other respects the FIG. 3 and FIG. 6 embodiments co-act with the clamping bolt in the same manner as was described above.

FIGS. 7 and 8 illustrate simple alternate structures for preventing relative axial motion between the clamping bolt head 30 and the clamp's ear 14. In FIG. 7, for example, the bolt's shank has a hole 94 drilled therethrough (in a position corresponding to the FIG. 2 embodiment's groove 38) for accommodating a tapper pin 96. In the FIG. 8 embodiment the bolt is similarly grooved at 98 to accommodate a conventional "C" clamp or the like 100. It will be apparent to those skilled in the art that either of these latter two alternative functions is substantially the same manner as was discussed in connection with the FIG. 2 embodiment's spring clip 40.

While the invention has been particularly shown and described with reference to preferred embodiments thereof it will be understood by those skilled in the art that various changes in form and details may be made therein without departing from the spirit and scope of the invention. For example, although the various structural aspects of the invention have been described in relation to a split-ring clamp for use in connection with the terminal post of a storage battery, they are also applicable to other types of similar clamps which have a tendency to become stuck closed and require a simple, but sufficient method for being opened.

The embodiments of the invention in which an exclusive property or privilege is claimed are defined as follows:

I claim:

1. In combination with a cable clamp of the type adapted to fit over a terminal post of a storage battery wherein said clamp has a pair of clamping ears extending therefrom, said ears having outer faces; inner opposing faces; and transverse apertures to receive a clamping bolt adapted to have a nut threaded thereon for tightening the clamping ears of said clamp; the improvement comprising:

said clamping bolt having means spaced apart from the head end thereof for substantially preventing axial motion of said bolt with respect to a first of said clamping ears;

and means attached to said nut for substantially preventing axial motion of said nut with respect to the second of said clamping ears, said means attached to said nut including a flange element having inwardly-directed spaced apart flange portions extending inwardly toward said bolt for engaging the inner face of said second ear to thereby move said second ear away from said first ear as said nut is moved away from said bolt head;

whereby rotation of said bolt in one direction causes said ears to be drawn together, and rotation of said bolt in the other direction causes said ears to be moved apart and thereby loosened from said terminal post.

2. The apparatus of claim 1 wherein said nut is rotatably attached to said inwardly-directed flange element.

3. The apparatus of claim 1 wherein said nut has a groove cut through its flats, said groove being in a plane substantially perpendicular to the threaded bore of said nut; and said inwardly-directed flange element has a slot cut in a face thereof, said slot being at least slightly wider than the diameter of said nut at said groove to permit said nut to slide in said slot so that the portion of said nut on one side of said grove is adapted to be adjacent to the outer face of said second ear and the portion of said nut on the other side of said groove is located outwardly of the slot in said flanged element.

4. The apparatus of claim 3 wherein said nut is rotatable with respect to said flanged element.

5. In combination with a cable clamp of the type adapted to fit over a terminal post of a storage battery wherein said clamp has a pair of clamping ears extending therefrom, said ears having outer faces; inner opposing faces; and transverse apertures to receive a clamping bolt adapted to have a nut threaded thereon for tightening the clamping ears of said clamp; the improvement comprising:

said clamping bolt having a substantially U-shaped element adjacent the head end thereof for substantially preventing axial motion of said bolt with respect to a first of said clamping ears, said U-shaped element having a body portion, legs, and inwardly-directed flanges of the end of said legs;

said inwardly-directed flanges being adapted to engage the inner face of said first clamping ear so that relative axial movement between said bolt head and said first clamping ear is limited by the length of said U-shaped member's leg portions; and means for substantially preventing axial motion of said nut with respect to the second of said clamping ears;

whereby rotation of said bolt in one direction causes said ear to be drawn together and rotation of said bolt in the other direction causes said ear to be moved and thereby loosened from said terminal post.

6. The apparatus of claim 5 wherein the substantially U-shaped member's leg elements are each comprised of first and second portions;

said first portions being separated by a distance corresponding to the size of said bolt head; and the second portions being separated by a distance corresponding to the height of said clamping ear.

References Cited

UNITED STATES PATENTS

| 1,659,094 | 2/1928 | Godfrey | 85—8.8 X |
| 1,979,382 | 11/1934 | Goldman | 339—230 |
| 2,032,834 | 3/1936 | Bunker | 39—230 |
| 2,577,714 | 12/1951 | Proff | 339—230 |
| 2,763,313 | 9/1956 | Bydalek | 151—41.7 |
| 3,189,077 | 6/1965 | Willis et al. | 151—69 |

FOREIGN PATENTS

| 504,741 | 8/1930 | Germany. |
| 660,746 | 11/1951 | Great Britain. |

RICHARD E. MOORE, Primary Examiner

J. H. McGLYNN, Assistant Examiner

U.S. Cl. X.R.

339—231